United States Patent

[11] 3,617,215

| [72] | Inventors | Yujiro Sugahara<br>Tokyo;<br>Masahiro Maeno, Nakajomachi; Shiro Eguchi, Nakajomachi; Hideaki Kurosaki, Shibata-shi, all of Japan |
|---|---|---|
| [21] | Appl. No. | 688,025 |
| [22] | Filed | Dec. 5, 1967 |
| [45] | Patented | Nov. 2, 1971 |
| [73] | Assignee | Mizusawa Kagaku Kogyo Kabushiki Kaisha<br>Higashi-ku, Osaka, Japan |
| [32] | Priority | Dec. 10, 1966 |
| [33] | | Japan |
| [31] | | 41/80962 |

[54] DRY ACID TREATMENT PROCESS OF ALUMINA-SILICA-TYPE CLAY
9 Claims, No Drawings

[52] U.S. Cl. ........................................... 23/182, 252/450
[51] Int. Cl. ........................................ C01b 33/18, B01j 11/58
[50] Field of Search ......................................... 23/182, 110; 252/450

[56] References Cited
UNITED STATES PATENTS

| 752,927 | 2/1904 | Schwahn | 23/182 X |
| 1,544,210 | 6/1925 | Bierce | 252/450 |
| 1,752,721 | 4/1930 | Bierce | 252/450 |
| 1,796,107 | 3/1931 | Jonas et al. | 252/450 X |
| 2,207,145 | 7/1940 | Doht | 252/450 |
| 2,472,489 | 6/1949 | Pierce | 252/450 |
| 2,484,828 | 10/1949 | Hickey | 252/450 |
| 2,551,580 | 5/1951 | Bond, Jr. | 252/450 X |
| 2,671,058 | 3/1954 | Mickelson | 252/450 |
| 2,892,800 | 6/1959 | Taipole | 252/450 |
| 2,981,697 | 4/1961 | Mickelson et al. | 252/450 |
| 3,016,355 | 1/1962 | Robinson et al. | 252/450 |

*Primary Examiner*—Edward Stern
*Attorney*—Sherman & Shalloway

ABSTRACT: Process for producing active clay or finely divided silica by intimately admixing an alumina-silica-type clay with 1.0 to 1.5 equivalents of an acid or an aqueous solution thereof, based on the basic metal constituents to be removed, the admixture of said acid or aqueous solution thereof with said clay being in a proportion of 0.3 to 2.5 parts by weight of the former to one part by weight of the latter, based on the dried product of said clay, thereby to form a nonfluid solid reaction product, and thereafter treating said reaction product with an aqueous medium having a pH of not more than 1 to remove by extraction the basic metal constituents contained in said product.

DRY ACID TREATMENT PROCESS OF ALUMINA-SILICA-TYPE CLAY

This invention relates to a process for producing active clay of finely divided silica by the acid treatment of alumina-silica type clay containing acid-soluble basic constituents. More specifically, the invention relates to a new acid treatment process of alumina-silica type clay which comprises in combination a dry acid treatment step wherein said alumina-silica type clay is admixed with an acid to form directly a nonfluid solid reaction product, and extraction step wherein the basic metal constituents contained in said reaction product are extracted and removed.

It has been known to treat either the montmorillonite-type clay mineral such as acid clay or the clay mineral whose principal constituent is halloysite, with an acid in a state in which these clays are immersed in an aqueous acid solution, thereby eluting and removing a part or almost all of the basic metal constituents contained in these clays to produce active clay or finely divided silica.

According to one of the processes known prior to this invention, active clay was produced by immersing acid clay in a large amount of a dilute acid solution, after which the slurry was heated with stirring, and thereafter the acid-treated product was washed with water, dried and comminuted.

Again, according to another process which was regarded as being a desirable procedure prior to this invention, for example, the process disclosed in Japanese Pat. Nos. 176,621, 182,331 and 186,327, active clay and finely divided silica were produced by the steps of granulating acid clay mechanically, immersing the so granulated product in an aqueous solution of a mineral acid, and thereafter water-washing, drying and comminuting the acid-treated granulated product.

As hereinabove described, the processes for producing active clay and finely divided silica, which were known prior to this invention, were in all cases processes which required that the material acid clay be immersed in a large amount of an aqueous solution of a mineral acid, i.e., they were processes in which the acid clay was given an acid treatment by the so-called wet process.

Hence, in the acid treatment of acid clay it was hitherto generally regarded that the basic metal constituents of the material clay had to be eluted into an aqueous solution of a mineral acid while reacting it with said mineral acid. And thus for achieving this end it was considered to be indispensable in the conventional processes that the reaction of the basic metal constituents of the acid clay with the mineral acid and the extraction of the basic metal constituents which have reacted with the acid be carried out at the same time in a large amount of an aqueous acid solution.

However, the hereinabove described so-called wet acid treatment process has numerous defects as yet in its application to commercial practice. In the first place, a great excess of acid is required according to this method of acid treatment, above 2 equivalents of the acid being required based on the basic metal constituents to be removed from the material clay in preparing active clay, and likewise above 2 equivalents of the acid being required based on the total basic metal constituents contained in the material clay in preparing finely divided silica. Thus, it is not economical as regards its use of the acid. Secondly, in this acid treatment method, since not only a large amount of waste acid is formed as a byproduct in concomitance with its use of a large amount of the aqueous acid solution but also a relatively large amount of free acid is contained in said waste acid, a special operation for removing the free acid becomes necessary when utilizing or disposing the waste acid. Thirdly, since the silicic portion of the material clay becomes eluted into the aqueous acid solution, not only the yield of the intended product decreases but also the silicic portion gets mixed into the aluminum salt when recovering the aluminum salt contained in the waste acid to impede the effective utilization of the basic metal constituents eluted into the waste acid. Fourthly, there is the drawback in the aforesaid wet acid treatment method that a large amount of the aqueous acid solution must be handled, with the consequence that the equipment inevitably becomes large. Further, since the conditions such as the temperature also become mild, the treatment time is prolonged, and hence the rate of space utilization per unit time also declines.

A primary object of this invention is to provide a new process for the acid treatment of alumina-silica type clay which comprises in combination a dry acid treatment step in which the alumina-silica type clay is admixed with an acid to form directly a plastic or solid reaction product and an extraction step in which the basic metal constituents contained in said reaction product are removed by extraction.

Another object of the invention is to provide a process for the acid treatment of alumina-silica type clay wherein the basic metal constituents contained in the material clay can be effectively removed with the use of a much less amount of acid than in the case of the conventional wet acid treatment methods and which also excels with respect to the effective utilization of the acid used and the basic metal constituents that are recovered.

According to this invention, the foregoing objects are achieved by a process for the acid treatment of alumina-silica type clay which is characterized in that in producing either active clay or finely divided silica by treating with an acid alumina-silica type clay containing acid-soluble basic constituents, said alumina-silica type clay is intimately admixed with 1.0 to 1.5 equivalents of an acid or an aqueous solution thereof, based on the basic metal constituents to be removed, the admixture of said acid with said clay being in a proportion of 0.3 to 2.5 parts by weight of the former to one part by weight of the latter, based on the dried product of said clay, thereby directly forming a plastic or solid reaction product, and thereafter treating said reaction product with an aqueous medium having a pH of not more than 1 to remove by extraction the basic metal constituents contained in said product.

According to our investigations, the following interesting facts were confirmed in the acid treatment of the alumina-silica type clay: namely, (1) that the reaction of the acid and the basic metal constituents contained in the clay could be accomplished essentially completely and moreover uniformly even when the acid or an aqueous acid solution is admixed with the alumina-silica type clay in an exceedingly lesser proportion than that of the conventional methods, such as in a proportion of 0.3 to 2.5 parts by weight of the former to one part by weight (dry basis) of the latter; and (2) that the extraction from the plastic or solid reaction product, and particularly even the anhydrous reaction product, directly formed by means of the foregoing reaction, of the basic metal constituents that have reacted with the acid is readily carried out without impairing the quality of the intended active clay or finely divided silica.

The foregoing fact was an entirely unexpected knowledge when viewed in the light of the prior art which taught that in producing active clay by the acid treatment of alumina-silica type clay it was necessary to elute the basic metal constituents contained in the clay continually while reacting said basic metal constituents with an acid in a state of immersion of the former in an aqueous acid solution.

Further, it was also found that according to the aforesaid dry acid treatment process of this invention, (3) that the amount to be removed of the basic metal constituents contained in the alumina-silica type clay was only determined by the amount of acid that is contacted and mixed with the material clay and that other treatment conditions had little, if any, effect; and (4) that, as noted in (1), above, even when the acid or aqueous acid solution is used in a small amount relative of the material clay, the amount of acid used need only be a very small amount, such as 1 to 1.5 equivalents based on the metal constituents to be removed, as compared with the case of the conventional methods, in view of the fact that the reaction product is directly obtained in a plastic or solid form.

Furthermore, according to the invention method, various classes of active clay can be obtained in accordance with the amount of acid used, which compare favorably in their adsorbability with the various classes of active clay that are produced by the conventional methods to meet the various purposes for which active clay is used. Again, finely divided silica can be obtained whose amount of basic metal constituents remaining behind is much less than that in the case of the conventional method and hence whose degree of whiteness is superior. This also is a new finding which could not possibly have been expected from the conventional wet process of acid treatment of acid clay.

The invention will be described more fully below.

Material clay

In this invention alumina-silica type clay containing acid-soluble basic constituents is used as the material clay. Clays which are conveniently used in this invention include the kaolin minerals such as halloysite, bentonite, sub-bentonite, and the dioctahedral type montmorillonite minerals such as acid clay. Of these natural clay minerals, acid clay, for example, generally has the following chemical composition.

| | |
|---|---|
| ignition loss (crystalline water) | 5.0–9.0% |
| $SiO_2$ | 5.5–8.5% |
| $Al_2O_3$ | 12–22% |
| FeO | 0.4–5.0% |
| $Fe_2O_3$ | 1.5–9.5% |
| CaO | 0.5–5.5% |
| MgO | 2.5–5.5% |

These naturally produced clays generally contain in their as produced state ca. 35–50 percent by weight of water on the basis of the dried clay. In this invention it is possible to use either the hereinabove as produced clay containing the water or that from which the water has been partially or completely removed.

Again, the aforesaid naturally produced alumina-silica type clay can be used as the material clay after having first purified it by an optional purification techniques such as a setting operation as elutriation or electrophoresis. The material clay may also be suitably crushed for ensuring that an intimate contact is had between the material clay and the acid.

In addition, according to the invention process, it is, of course, possible to use not only the naturally produced clay or the purified natural clay but also the already chemically treated alumina-silica type clay such as active clay.

The term "basic constituents," as herein used, specifically denotes the constituents such as $Al_2O_3$, FeO, $Fe_2O_3$, CaO and MgO. On the other hand, the term "basic metal constituents" has a meaning which also takes into consideration the valency of the metal contained in the foregoing basic constituents Taking, for example, the iron constituent, it is dealt either as bivalent or trivalent depending upon how it is contained in the material clay.

Acid treatment

In this invention, the alumina-silica type clay containing an acid-soluble basic constituent is intimately admixed with an acid or an aqueous acid solution thereof to form directly nonfluid solid reaction product. The "nonfluid solid" means a state which is plastic as well as perfectly solid.

The class of acids used may be either the mineral acids such as sulfuric, hydrochloric and nitric acids, or the organic acids such as oxalic and acetic acids. The mineral acids are to be preferred from the economical standpoint, particularly preferred being sulfuric acid which is a dibasic acid. The acid used may be one which does not contain free water, such as fuming sulfuric acid, or may be an aqueous solution of an acid such as dilute sulfuric acid. Again, it may also be a mixture of various acids.

In this invention, the acid is used in an amount of 1.0 to 1.5, preferably 1.0 to 1.2 equivalents, based on the basic metal constituents to be removed from the alumina-silica type clay, but the amount of the basic metal constituents to be removed will vary depending upon the class of the active clay product intended. When active clay is the intended product, about 10 percent to 90 percent of the total basic metal constituents of the alumina-silica type clay must be removed. On the other hand, when the intended product is finely divided silica, preferably as much as possible of the total basic metal constituents contained in the alumina-silica type clay should be removed. Hence, in the acid treatment process according to this invention, 0.2 to 0.9 equivalent of acid, based on the total basic metal constituents contained in the alumina-silica type clay, is used when active clay is the intended product, whereas 0.9 to 1.5 equivalents of acid, based on the total basic metal constituents, is used when the intended product is finely divided silica. The amount of acid used, such as hereinabove indicated, correspond to 1.0 to 1.5 equivalents of the basic metal constituents to be removed, as required for producing the respective intended products.

The reason that in this invention the amount used of the acid, based on the basic metal constituents to be removed, is prescribed as being 1.0 to 1.5 equivalents, and hence also includes those instances where the amount of acid used exceeds its equivalent is because allowance is made for the amount of acid which is consumed for foreign matter such as organic substances and pyrites which are present in the alumina-silica type clay material used in the invention process besides the silicic portion and basic constituent. Further, the amount of acid consumed due to an increase in valency is also taken into account to cover those instances where the iron salt in the material is present as a bivalent salt, which after reaction is oxidized to a trivalent salt. However, in the conventional methods of acid treatment of acid clay for producing active clay, the amount of acid used was usually above 2 equivalents, based on the basic metal constituents to be removed. On the other hand, in producing finely divided silica, a large amount of acid as above 2 equivalents, based on the total basic metal constituents, was used. Hence, the invention process is also distinguishable from the conventional methods in respect of the amount of acid used.

An important feature of the invention process resides in directly forming the nonfluid solid reaction product by intimately admixing the acid or an aqueous solution thereof in the equivalent range hereinabove indicated, with the material clay, in a proportion such that the amount of the acid or an aqueous solution thereof becomes 0.3 to 2.5 parts by weight to one part by weight of the clay on dry basis.

The terminology "the amount of the acid or an aqueous solution thereof becomes 0.3 to 2.5 parts by weight," as herein used, is meant to be an amount based on the material clay. Thus, when the material clay and the acid or an aqueous solution thereof are blended and contacted with each other, this means that the weight ratio of the dried product of the clay to the acid or an aqueous solution thereof is 1:0.3–2.5. Hence, when clay containing water is used as the material clay, the ratio of the dry clay to the aqueous acid solution must be calculated after adding the water content of the clay to the acid or the aqueous acid solution.

In accomplishing the intimate contact of the material clay with the acid or an aqueous solution thereof, any of the means well known to the art for mixing solids or solids and a small quantity of liquid can be used, including such as the mixer, agitator, granulator and grinder.

The reaction of the acid and the basic metal constituent contained in the material clay can be carried out either at room temperature or a temperature ranging between room temperature and a temperature such a 600° C. Thus, the alumina-silica type clay which has been mixed and contacted with the prescribed amount of acid or aqueous acid solution is either allowed to stand at room temperature or heated to an elevated temperature to complete the reaction of the acid with the basic metal constituents contained in the clay.

For carrying out the reaction of the acid and the basic metal constituents in a short period of time, it is an advantage to heat the mixture of the clay and the acid or an aqueous solution thereof to a temperature ranging, say, between 60° C. and 300° C. It was found however that in the case of the dry acid treatment process of this invention there was a considerable rise in the temperature of the mixture of the clay and the acid or aqueous acid solution by its own reaction heat even though it is left standing without application of heat from the outside, since, as hereinbefore noted, a considerably lesser amount of the acid or aqueous acid solution is used per unit amount of the material clay, as compared with the conventional methods. Hence, it is possible according to the invention dry acid treatment process to complete the reaction in a shorter period of time than the conventional wet acid treatment methods, even when the mixture of the clay and the acid or aqueous acid solution is just allowed to stand without being heated.

The reaction of the acid with the basic metal constituent contained in the material clay can be carried out in either an open or closed atmosphere, or under reflux or nonreflux conditions. The important thing is to ensure that the reaction conditions are so established that a nonfluid solid reaction product is obtained on termination of the reaction.

In an especially preferred mode of practicing the invention method, the acid or the aqueous acid solution is reacted with the clay in such a proportion that the amount of the acid or aqueous acid solution used becomes 0.3 to 1.5 parts by weight for every one part by weight of the dry clay. When the acid or aqueous acid solution is used at the above rate, the mixture of the alumina-silica type clay and the acid or aqueous acid solution is already in a plastic or solid state at the time of its mixture. Hence, according to this mode, there is no need at all of handling the clay in its difficulty handled liquid state, and the reaction of the basic metal constituents contained in the material clay and the acid or aqueous acid solution is carried out in the solid phase throughout the course of the reaction. Therefore, according to this mode of the invention process, the establishment of the other reaction conditions is not of great importance.

When the clay used is one whose water content is great or the concentration of the acid or aqueous acid solution used is relatively low or a great amount of acid is used for producing finely divided silica, there are instances in the invention process where the acid or aqueous acid solution must be used in a proportion of 1.5 to 2.5 parts by weight of the acid or aqueous acid solution for every one part by weight of the dry clay. A mixture of the material clay and the acid or aqueous acid solution in such a proportion usually presents a viscous creamy appearance. According to the invention process, the reaction of the acid with the basic metal constituents contained in the clay can also be carried out in the case of a creamy mixture such as this while maintaining a dry or nondry condition in accordance with the liquid proportion of the acid or aqueous acid solution, thus directly forming a plastic or solid reaction product.

In the case the liquid weight ratio of the acid or aqueous acid solution to the dry clay is close to 1:1.5 or the acid concentration of the acid or aqueous acid solution is high, a plastic or solid reaction product can be directly obtained. The maintenance of the mixture in a dry state is readily accomplished by heating the mixture positively. Thus the reaction between the acid and the basic metal constituents proceeds while the free water is being eliminated from the mixture.

According to our studies, we found that when the amount of the acid or aqueous acid solution was increased relatively of the material clay there existed a zone in which a very stable creamy mixture was formed during the transition of the mixture from its plastic state to a slurry state.

It was also found that in this creamy mixture of the clay and the acid or aqueous acid solution the contact between the clay and the acid or aqueous acid solution was maintained intimately and stably, and that, in addition, by just maintaining this mixture under dry conditions the free water content of the mixture was eliminated while maintaining the aforesaid stable condition and thus the reaction of the acid and the basic constituents of the material clay was not only accelerated but also made to proceed uniformly.

When the acid or aqueous acid solution is used in an amount outside the hereinbefore noted range as prescribed by the invention, i.e., when the acid or aqueous acid solution is used in a proportion in excess of 2.5 parts by weight of the acid or aqueous acid solution to one part by weight of dry clay, the mixture of the material clay and the acid or aqueous acid solution forms an unstable slurry from which there is the tendency to the separation readily of a supernatant liquid, with the consequence that it is utterly impossible to hope for an intimate contact of the material clay and the acid or aqueous acid solution as a unitary mass. In contradistinction, when, as in this invention, the acid or aqueous acid solution is used in proportion of 1.5 to 2.5 parts by weight thereof to one part by weight of the dry clay, the material clay and the acid or aqueous acid solution forms a stable, creamy, intimate mixture in which the acid and the basic metal constituents react even when said mixture is merely allowed to stand in an open or closed atmosphere to yield directly a plastic or solid reaction product.

In this invention, the plastic or solid reaction product obtained in the hereinbefore dry acid treatment step is usually obtained in most cases as granules or small aggregates. The face that the reaction product is in the form of granules or small aggregates is desirable in the hereinafter described extraction step, since the handling of the product during the extraction operation is greatly simplified.

When the material clay and the acid or aqueous acid solution are used in the invention process in a quantitative proportion such that the mixture formed is plastic or solid, the mixture can be positively granulated into an optional form by the use of an optional granulator, and the reaction can also be completed concurrently with the granulation or subsequently thereto.

On the other hand, when the mixture of the material clay and the acid or aqueous solution is creamlike, it can be fed or sprayed either into a heated gas atmosphere or onto a heated plate in streamlets or small drops, thus removing the water content of the mixture and at the same time reacting the acid with the basic constituents contained in the mixture to form concurrently the reaction product into granules or small aggregates.

Alternatively, the mass of plastic or solid reaction product formed in a suitable vessel or a conveying means can be roughly ground into small aggregates of suitable size.

Extraction and separation of the basic metal constituents

The plastic or solid reaction product which has been obtained by means of the hereinbefore described dry acid treatment step contains the basic metal constituents to be removed as salts of the acid used in the reaction.

According to this invention, the basic metal constituents contained in the solid reaction product are extracted and removed therefrom with an aqueous medium of a pH not more than 1, and preferably not more than 0.5.

When the pH of the extraction medium is greater than 1 in this extraction operation, there is a tendency of the salts of the basic metal constituents to becomes susceptible to hydrolysis to result in a decline in the quality of the product. Hence, the aqueous medium used in the invention process is one having a pH of not more than 1, and preferably not more than 0.5. The treatment of the reaction product in a an aqueous medium of a pH not more than 1, as herein used, means that this requirement is satisfied if the pH of the aqueous extraction medium is not more than 1 when the reaction product is introduced therein. Thus, in those cases where free acid still remains in the reaction product, for example, when the amount of the free acid in the reaction product is sufficiently great as compared with the amount of the extraction medium, water, as such, can be used as the extraction medium. In most cases, as the aqueous medium, an aqueous solution of such mineral acids as sulfuric, hydrochloric and nitric acid having a concentration on the order of 2 to 7 percent is particularly used with convenience. Again, it is, of course, also possible to use an aqueous solution of the other inorganic or organic acids, provided that the aforesaid conditions are satisfied.

In the present invention it is particularly preferable to use an aqueous medium containing an inorganic salt as the extraction medium. We found that the coexistence of an inorganic salt in the extraction medium can prevent disintegration of granules or small aggregates of a plastic or solid reaction product of clay and the acid or aqueous solution thereof in the extraction operation. Every inorganic salt that is soluble in an aqueous medium is usable as such salt. Generally, the use of salts particularly mineral acid salts of the basic metal constituents contained in the starting clay is preferable to prevent the contamination of a final product Thus, aluminum sulfate, ferrous sulfate, ferric sulfate, calcium sulfate, magnesium sulfate and mixtures of these salts are used. It is generally preferred that such salt is contained in an amount of 2 to 15 percent by weight in the extraction medium. While it is possible to use an aqueous medium for extraction which is prepared by adding such salt thereto prior to extraction, it is particularly preferred that an extraction medium which has been previously used for the extraction of a nonfluid solid reaction product of clay and the acid or aqueous solution thereof and which contains salts of the basic metal constituents of clay, is used for the extraction of the basic metal constituents.

Thus, in this embodiment of the present invention, as it is possible to maintain the acid treated clay in a form of granules or small aggregates throughout the extraction operation, such advantages as easy separation of the product from the extraction medium and easy after treatment are brought about.

In carrying out the extraction operation, any of the extraction apparatuses well known to the art may be employed. For example, usable are the well known extraction apparatuses such as the mixer settler, the fixed bed or moving bed type solid-liquid extraction apparatus using a packed layer, the continuous, horizontal, rotating type extraction apparatus and the filter press type dialytic apparatus. In addition, it is also possible to adopt a method consisting of mixing the solid reaction product in the aqueous extraction medium, following which separation is accomplished by means of an operation such as centrifuging or decantation.

In the extraction and removal of the basic metal constituents from the solid reaction product, there is no particular restriction as to the temperature of the extraction medium. It is however an advantage to use a heated extraction medium for enhancing the rate of extraction of the basic metal constituents. Hence, from the operative standpoint it is preferred to carry out the extraction operation at a temperature of 50°–80 C.

Another important advantage of the invention process is that the operation of extracting the basic metal constituents from the reaction product is very easily accomplished as a result of having obtained the reaction product in a plastic or a solid state by submitting the material clay to a dry acid treatment step. Further, according to the invention process, not only is it possible to collect the salts of the basic constituents in a concentrated state, but also the defect of the conventional methods that the silicic portion would also elute along with the salts of the basic metal constituent is rarely, if ever, observed.

Posttreatment

The acid-treated product removed of the basic metal constituent in an amount desired by means of the hereinbefore described extraction step is then water-washed by an operation similar to hereinbefore described extraction operation and thereafter dried and comminuted to obtain the final product.

The product obtained by the invention process can be given various posttreatments depending upon the final use to which it is to be put. For example, the alkali and alkaline earth compounds, the fatty acid salts of alkali and alkaline earth metals, or the other salts, zinc white and zinc oxide can be added to the water-washed silica gel in accordance with the methods disclosed in Japanese Pat. Nos. 177,527; 178,485; 178,488; 180,920; 181,110; 182,330; 182,337; 185,212; 185,513; 188,551; 190,572; 196,352; 229,746; 286,309 and Japanese Pat. application publication No. 1256/1962. Further, as required the mixture can be submitted to a neutralizing treatment, such as an acid treatment, to obtain silicates whose dispersibility and activity have been enhanced.

It was truly unexpected that that the product according to this invention would possess qualities which were comparable, if not superior, to that of convention methods, even in those cases where the conditions employed were much more severe than those of the conventional wet acid treatment methods. For example, the finely divided silica produced according to a conventional method by means of the so-called wet acid treatment consuming a great amount acid and much time, i.e., about 4 equivalents of sulfuric acid for the total basic constituents and 36 hours at about 90° C., still contains 1.5 – 3.0 percent of alumina portion ($Al_2O_3$). In contradistinction, the product obtained according to this invention by means of a dry acid treatment using 1.5 equivalents of acid for 30 minutes at 350° C. contains only 0.5–0.8 percent of impure alumina portion.

Further, the activated clay produced according to the invention process by using 0.4 equivalent of acid for the total basic metal constituents contained in the material acid clay and being submitted to a dry acid treatment for 30 minutes at 200° C. has an adsorbability which is comparable, if not superior, to that of the conventional active clay obtained by a wet acid treatment for 9 hours at 850° C.

The following nonlimitative examples are given for further illustration of the invention. The term "equivalent," as used in the examples, unless otherwise specified, denotes a chemical equivalent for the instance in which the amount of acid calculated as reacting with the total basic metal constituents contained in the dry material clay is designated as one equivalent, the calculation being based on the assumption that the acid reacts completely with said basic metal constituents chemically equivalently. On the other hand, the term "liquid weight ratio" denotes the weight ratio of the acid or the aqueous solution thereof to the material clay on a dry basis.

EXAMPLE 1

In this example the instance of acid-treating acid clay to an extent necessary for producing active clay for low temperature use (active clay which demonstrates decolorizability at relatively low temperatures) will be described.

As the material acid clay (hereinafter to be referred to as material clay), that produced at Nakajo, Kitakanbara-gun, Niigata Prefecture, Japan was chosen. This material clay will be referred to as material clay A. Material clay A contains 42 percent free water, and the principal analytic values of its dried product are as follows: $SiO_2$ 70.55%, $Al_2O_3$ 14.52%, FeO 1.83%, $Fe_2O_3$ 1.54%, MgO 5.57%, CaO 0.83%, ignition loss 5.50 percent.

The 300 grams of this material clay A containing 42 percent water were added and mixed about 73 grams of 98 percent sulfuric acid. This amount of the sulfuric acid corresponds to 0.66 equivalent of the total basic constituents contained in the material clay A.

A kneading granulator was used and the material clay particles and the acid making up the mixture were first intimately contacted with each other, following which the mixture was immediately granulated into cylindrical granules 5 mm. in diameter and about 15 mm. in length. The proportion of this mix corresponds to 1.14 parts by weight of the aqueous acid solution to one part by weight of the dry clay. Thus, small cylindrical granules of sufficiently suitable hardness are granulated with a liquid weight ratio of 1.14.

For carrying out the reaction of this mixed granular product, a vessel 6.5 cm. in diameter and 17 cm. in height comprising a hard glass tube whose bottom was covered with a wire netting was made. Three hundred grams of the mixed granular product prepared under the hereinabove given conditions were placed in this vessel, after which the vessel was placed in a 150° C. constant temperature bath where it was left to react for 2 hours, thus obtaining a solid reaction product.

Next, the extraction operation carried out in the following manner. As the extraction apparatus, a glass tube 4 cm. in diameter and 30 cm. in height capable of being heated and kept warm and having a foraminous plate of porcelain disposed at a point 10 cm. from its bottom was used. This column was filled with an aqueous extraction medium and sulfuric acid solution having a pH 0.5, after which the aforesaid reaction product was placed in the column in such a manner that it was suspended in the aqueous medium. The extraction was carried out thus by allowing it to stand for one hour while a temperature of 80° C. was maintained. The soluble salts formed by this operation was eluted. Since the specific gravity of the solution of the salts was greater than that of the sulfuric acid solution, the former settled to the bottom of the column. After collecting the soluble salts in the column at below the foraminuous plate in this manner, sulfuric acid solution of a pH 0.5 was poured into column from the top, while an equal amount was drawn from the bottom. When this operation was continued, the salts of the reacted basic constituents were collected in the extraction liquid in high concentration. This extraction liquid contained 11.5 percent of a alumina portion (as $Al_2O_3$), and when it was cooled, it immediately hardened in this state to yield solid iron-containing aluminum sulfate.

Thereafter, this was further washed with sulfuric acid solution of a pH 0.5 followed by washing with water. The cylindrical granular products maintained their granular form without becoming slurrylike until the completion of the water-washing operation.

When the so-treated product whose water-washing had been completed was dried for 2 hours at 110° C. and then dry comminuted for 30 minutes, acid-treated acid clay, i.e., active clay for low temperature use was produced.

The activity of this product as measured as to its decolorizability of oils and fats in accordance with the active clay decolorizability test method of the oil and fat test methods of the Japan Oil Chemists Society.

The oil chosen for testing in this test was deoxidized soybean oil, and the test was conducted by adding the active clay in an amount of 2 percent and for a treatment time of 20 minutes at 100° C. The light transmittance of deoxidized soybean oil used in this instance was 56 percent. The decolorizability, as shown by the extent to which the decolorized oil was decolored, was indicated by the light transmittance. Accordingly, as the transmittance (percent) becomes higher, the indication will be that the decolorizability is better. By way of comparison, a similar test was conducted on the commercial active clay for low temperature use of a standard grade. Further, analyses of the composition of the product and the recovered solid iron-containing aluminum sulfate and that of the standard active clay and the commercial solid iron-containing aluminum sulfate were made.

The results of the tests and analyses are given below.

is concurrently produced as a byproduct on this occasion is usable as a water treatment flocculation agent whose content of insoluble portion is low.

EXAMPLE 2

In this example the instance of acid-treating acid clay to an extent necessary for producing active clay for high temperature use (active clay which demonstrates decolorizability at relatively high temperature) will be described.

Material clay A, as used in example 1, was used as the starting material acid clay.

To 300 grams of this material clay A containing 42 percent free water were added and mixed about 24 grams of 98 percent sulfuric acid. This amount of the sulfuric acid corresponds to 0.38 equivalent of the total basic constituents contained in the material clay, the liquid weight ratio being about 1.04 in this instance.

AFter fully accomplishing the intimate contact of acid and the clay material of the mixture in a mortar, the mixture was immediately placed in a porcelain vat to a thickness of about 1-2 cm., after which the reaction was carried out by allowing the vat to stand still for 2 hours in a constant temperature bath of 150° C. The solid reaction product obtained was in the form of small flaky granules due to the reaction and the volatilization of the water content. The somewhat larger aggregates could be readily crushed by hand into small granules.

The reaction product was introduced into sulfuric acid solution of pH 0.5, and the soluble salts formed by the reaction were extracted and separated followed by cleansing and water-washing. In this extraction and washing operation, the reaction product which was in the form of small granules did not disintegrate and disperse in a slurry form, and even though it disintegrated, it still maintained its granular form though in smaller size, and hence the separation of the liquid and solid phases could be readily carried out.

When this water-washed treated product was dried for 2 hours at 110° C. and then dry comminuted for 30 minutes, an acid treatment-completed acid clay, i.e., active clay for high temperature use, was produced.

The activity of this product was measured as to its decolorizability of oil in accordance with the test method for active clay for high temperature use. The test method for active clay for high temperature use is conducted in the following manner. Thirty grams of diesel engine oil is placed in a hard glass test tube, to which is then added 1.5 grams of the product (5 percent of the oil).

This test tube is fitted to a decolorization tester whose oil bath is 250°±1° C. [see "Kagaku To Kogyo," vol. 4, No. 4, 126 (1951)], and an agitation is carried out for 15 minutes, following which the water clay is separated by filtration, using a qualitative analysis filter paper, thereby obtaining the decolorized oil.

|  | Decolorizability, percent | Analysis of product, percent | | | | | | | Mole ratio, $SiO_2/Al_2O_3$ |
|---|---|---|---|---|---|---|---|---|---|
|  |  | $SiO_2$ | $Al_2O_3$ | FeO | $Fe_2O_3$ | MgO | CaO | Ignition loss |  |
| Product obtained in Example 1 | 87.8 | 82.39 | 7.22 | 0.32 | 1.60 | 0.24 | 1.51 | 4.90 | 19.34 |
| Standard active clay for low temperature use | 84.0 | 73.21 | 11.16 | 2.23 | 2.64 | 1.87 | 0.58 | 7.62 | 11.12 |

|  | Composition of iron-containing aluminum sulfate, percent | | | | | | | |
|---|---|---|---|---|---|---|---|---|
|  | $Al_2O_3$ | FeO | $Fe_2O_3$ | MgO | CaO | Insoluble portion [1] | $SO_3$ | Free $H_2SO_4$ |
| Solid iron-containing aluminum sulfate obtained in Example 1 | 11.53 | 0.11 | 3.41 | 1.34 | 0.18 | 0.01 | 44.58 | 1.80 |
| Commercial solid iron-containing aluminum sulfate [2] | 11.64 | 1.82 | 2.13 | 1.21 | 0.19 | 0.09 | 39.02 | 3.00 |

[1] The insoluble portion consists of those acid-insoluble substances which are mainly silic portion,
[2] Commercial solid iron-containing aluminum sulfate is a product which has been produced by neutralizing with aluminum hydroxide the 10% free acid-containing waste acid which is formed as a by-product when acid clay is treated with sulfuric acid by means of the so-called wet process.

It can be understood from the foregoing results that the active clay for low temperature use which has been obtained by the sulfuric acid treatment of acid clay in accordance with the procedure described in example 1 is superior in its quality to the commercial standard active clay.

Further, the solid iron-containing aluminum sulfate, which

The color of this decolorized oil is determined by measuring the light transmittance with a 20 mm. cell, using a photoelectric photometer. The light transmittance (percent) was designated as the decolorizability. Further, a total analysis of the product was also performed.

By way of comparison, a similar test and analysis was also carried out on the standard commercial active clay for high temperature use.

The results of the tests and analyses are given below.

| | Decoloriz-ability, percent | Total analysis, percent | | | | | | Ignition loss | Mole ratio, $SiO_2/Al_2O_3$ |
|---|---|---|---|---|---|---|---|---|---|
| | | $SiO_2$ | $Al_2O_3$ | FeO | $Fe_2O_3$ | MgO | CaO | | |
| Product obtained in Example 2 | 60.3 | 77.98 | 11.36 | 0.42 | 2.14 | 0.29 | 2.32 | 5.41 | 11.71 |
| Standard active clay for high temperature use | 56.0 | 78.12 | 11.38 | 1.03 | 1.18 | 0.22 | 2.60 | 5.21 | 11.73 |

It can be seen from the foregoing results that the active clay for high temperature use obtained in Example 2 by the acid treatment of acid clay is superior to the standard commercial active clay.

EXAMPLE 3

In this example the instance where acid clay is thoroughly treated to an extent that it can be used as finely divided silica for used as reinforcing fillers of rubber, etc., will be described.

The material acid clay used was the material clay A as used in example 1. This material clay A containing 42 percent of free water and a dried powder of said material clay A (that from which the water content had been removed in a 110° C. dryer until a free water content of 3–4 percent was reached followed by comminution) were mixed in a ratio of 8:2 by weight, to which was then added and thoroughly mixed 98 percent sulfuric acid in an amount to correspond to 1.5 equivalents of the total basic constituents contained in the clay mixture. That is to say, 51 ml. of 98 percent sulfuric acid were added per 100 grams of the material clay A on a dry basis. First of all, the particles of the material clay and the acid of this clay mixture were thoroughly contacted with each other, using a kneading molder, following which the mixture was granulated into cylindrical granules 5 mm. in diameter and about 15 mm. in length. The liquid weight ratio in this case was 1.45, which was suitable for providing the granules with a sufficient hardness for maintaining its form as small granules.

For carrying out the reaction of this granular product, it was treated in a forced draft system for one hour at 350° C. As the forced draft type reaction apparatus, a forced draft type reaction column consisting of a hard glass tube 3 cm. in diameter and 40 cm. in height having a foraminous plate of porcelain disposed at a point 10 cm. from the bottom and wound externally with a nichrome wire was used, the apparatus being so adapted that dry air could be introduced from the top of the reaction column and the reaction gas could be taken out from the bottom thereof. The specimen was secured on the foraminous plate in the reaction column. Namely, 60 grams of the aforesaid granular mixture was secured in this reaction column and the acid clay was subjected to a thorough acid treatment by carrying out the reaction for 1 hour at 350° C. to obtain a solid reaction product. In this case, the somewhat excess free sulfuric acid, i.e., the free sulfuric acid owing to the fact that the sulfuric acid used was 1.5 times the equivalent, decomposes and evolves as $SO_2$ gas. The so evolved $SO_2$ gas in an amount of about 9 grams in terms of 98 percent sulfuric acid was recovered in customary manner.

Next, the extraction operation consisting of extracting and recovering the soluble basic constituents, cleaning and water-washing was carried out as in example 1. The so obtained water-washed treated product was then subjected to dry comminution and elutriation, followed by passing the product through a 300-mesh screen, collecting and drying the product. Thus was obtained finely divided silica of thoroughly acid-treated acid clay. At the same time, solid iron-containing aluminum sulfate was obtained from the recovered extraction liquid.

The properties of this product was judged from its amount of oil absorption, specific surface area and bulk density, and comparison was made at the same time with the commercial finely divided silica. The commercial finely divided silica which was here used as the standard product was one which was produced by the thorough treatment of acid clay in accordance with the conventional wet method. The foregoing results are shown in the following tables along with the total analyses of the products as well as the analysis of the recovered solid iron-containing aluminum sulfate.

| | Total analysis, percent | | | | | | Amount of oil absorption [2] (ml./g.) | Specific surface area [3] (m.²/g.) | Bulk density [4] (g. ml.) |
|---|---|---|---|---|---|---|---|---|---|
| | $SiO_2$ | $Al_2O_3$ | $Fe_2O_3$ [1] | CaO | MgO | Ignition loss | | | |
| Product obtained in Example 3 | 94.56 | 0.75 | 0.49 | 0.0 | 0.62 | 3.99 | 2.0 | 125 | 0.25 |
| Commercial finely divided silica | 91.63 | 1.65 | 0.46 | 2.25 | 0.0 | 4.23 | 1.9 | 120 | 0.27 |

[1] Including FeO.
[2] Oil absorption is a value obtained in the following manner: One gram of accurately scaled dry specimen is placed on a white porcelain plate. This is kneaded with a stainless steel spatula while adding boiled linseed oil in small increments. When the specimen becomes a single mass and the mixture of the specimen and oil has become such that it does not stick to the porcelain plate, the adding of the linseed oil is stopped. The amount of oil required for this kneading operation is designated as the amount of oil absorption.
[3] Specific surface area is a value determined by the BET method in accordance with the gas adsorption method that is generally used in measuring the specific surface area of powders.
[4] Bulk density is a value determined by the iron cylinder method. (See Akao, Journal of The Society of Rubber Industry, Japan 31 53 (1958).) The bulk density in accordance with the iron cylinder method is indicated as the number of grams per cubic centimeter when the specimen has been compressed with a pressure of 0.05 kg. per square centimeter.

Composition of the Solid Aluminum Sulfate (%)

| | |
|---|---|
| $Al_2O_3$ | 10.77 |
| FeO | 0.23 |
| $Fe_2O_3$ | 3.34 |
| MgO | 3.42 |
| CaO | 0.30 |
| insoluble portion | 0.005 |
| total $SO_3$ | 41.19 |
| free $H_2SO_4$ | 0.12 |

Further, in the following table are shown the results obtained when the finely divided silica produced in example 3 was actually compounded in rubber, comparison being made with the instance of the commercial standard finely divided silica. The rubber compound testing method was conducted in accordance with JIS K-6301 (1958).

| | 300% modulus (kg./cm.²) | Tensile strength (kg./cm.²) | Elongation (percent) | Hardness (percent) | Dispersibility |
|---|---|---|---|---|---|
| Product obtained in Example 3. | 58 | 128 | 700 | 50 | Good. |
| Standard finely divided silica. | 57 | 122 | 680 | 49 | Do. |

It can be seen from the foregoing results that the product which consists of acid clay which has been thoroughly acid treated by the procedure described in example 3 is a product which excels as finely divided silica to be used as a reinforcing filler, and that, as compared with the product obtained by the conventional methods, its particular feature resides in its low content of the alumina portion. Further, it is seen that the free sulfuric acid is recovered during the processing step and also that the recovered soluble basic constituents can be used as a water-purifying flocculating agent, and particularly as solid iron-containing aluminum sulfate whose content of insoluble portion is low.

EXAMPLE 4

In this example a mode in which acid clay is acid treated in the absence of water will be described.

As the material acid clay, the material clay A, as used in example 1, was used, it being used after its water content was removed until the content was 1.5 percent by drying it for 5 hours at 110° C. 50 percent sulfuric anhydride ($H_2SO_4 \cdot 0.5SO_3$) was used as the treating acid.

To 100 gram each of this dried material clay was added the 50 percent sulfuric anhydride in the amounts corresponding respectively to 0.5, 1, 1.2 and 1.5 equivalents of the total basic metal constituents. After the clay and the sulfuric anhydride were intimately mixed, the reaction was carried out as in example 2 to obtain the solid reaction products. After the reaction products were rendered into small flaky granules, the reacted soluble basic constituents were extracted and separated as in example 1 followed by similar cleaning, water-washing, drying at 110° C. and comminuting operation, thereby obtaining the products which have been treated with the acid in varying amounts.

The so obtained products were measured as to their properties, the properties measured being the amount contained of $R_2O_3(Al_2O_3+Fe_2O_3+FeO)$, the decolorizability (unless otherwise indicated, the decolorizability hereinafter indicated will be that determined as in example 1 in accordance with the testing method for active clay for low temperature use, using deoxidized soybean oil as the oil to be tested), and the amount of oil absorption. The results obtained are shown below.

| Amount of acid used | Liquid weight ratio at time of mixing | $R_2O_3$ in product (%) | Decolorizability of product (%) | Amount of oil absorption of product (ml.) |
| --- | --- | --- | --- | --- |
| 0.5 | 0.31 | 1.45 | 78.0 | 0.7 |
| 1 | 0.59 | 1.69 | 72.5 | 0.83 |
| 1.2 | 0.71 | 1.07 | 69.7 | 0.93 |
| 1.5 | 0.88 | 0.58 | 66.2 | 0.57 |

It can be seen from the foregoing results that the acid clay can be fully acid treated in the absence of water and that products can be obtained suitable for the varied uses in accordance with the amount of acid used.

EXAMPLE 5

In this example the instance will be described in which active clay for low temperature use is produced varying the class of the material acid clay used.

The material clay chosen was that produced in Kamigo, Tsuruoka-shi, Yamagata Prefecture, Japan. This material clay will be referred to as material clay B. This material clay contains 46 percent free water and its principal analytic values are: $SiO_2$ 57.73%, $Al_2O_3$ 22.80%, $FeO$ 1.48%, $Fe_2O_3$ 68.1%, $MgO$ 4.50%, $CaO$ 0.23% and ignition loss 7.30 percent.

One hundred fifteen grams of 98 percent sulfuric acid were intimately mixed with 300 grams of this material clay B. This amount of acid corresponds to about 0.7 equivalent of the total basic metal constituents contained in material clay B.

The mixture in which the material clay B and 0.7 equivalent of sulfuric acid have been intimately mixed was granulated as in example 1, following which the granular product was immediately reacted for 1 hour at 200° C. using the forced draft apparatus as used in example 3, thereby obtaining a solid granular reaction product.

The extraction and separation of the salts of the soluble basic metal constituents reacted was carried out by performing the extraction operation of the so obtained granular product, using the extraction apparatus as used in example 1. This was followed by a similar cleansing and water-washing operation. There was no disintegration of the granular product until its water-washing was completed. When this water-washed treated product was then dried for 2 hours at 110° C. and thereafter dry comminuted for 30 minutes, the acid-treated acid clay, i.e., the active clay for low temperature use, was produced.

This product was measured as to its decolorizability as in example 1 and also a total analysis of the product was preformed with the results shown below.

Product obtained in Example 5

| | |
| --- | --- |
| Decolorizability | 86.7% |
| Total analysis of the product | |
| $SiO_2$ | 79.53% |
| $Al_2O_3$ | 11.42 |
| $FeO$ | 0.16 |
| $Fe_2O_3$ | 1.98 |
| $MgO$ | 3.11 |
| $CaO$ | 1.12 |
| ignition loss | 5.25 |
| Mole Ratio $SiO_2/Al_2O_3$ | 11.83 |

It can thus be seen from the foregoing results that excellent active clay can be obtained even though the class of the acid clay is varied.

EXAMPLE 6

In this example the instance where acid clay is acid treated to an extent such as to produce finely divided silica using material clay B is described.

Material clay B was dried at 110° C. to obtain dried material clay B. This dried material clay contained 1.5 percent of water. A mixture was prepared by adding 137 grams of 98 percent sulfuric acid to 100 grams of the dried material clay B. The liquid weight ratio in this case was 1.40. Further, heat was generated in forming this mixture and the temperature rose to 90° C. This thoroughly blended mixture was granulated as in example 3.

The reaction of this granular mixture was carried out as in example 3 by heating in a forced draft system for one hour at 350° C.

Next, the reacted soluble basic constituents contained in the reaction product were extracted and separated as in example 1, after which cleansing and water-washing of the product was carried out. The so obtained water-washed treated product was wet comminuted, elutriated and passed through a 300-mesh screen, after which the product was collected and dried. Thus was obtained finely divided silica of thoroughly acid-treated acid clay.

The properties of this product will be represented by means of the test results of its amount of oil absorption, specific surface area and bulk density along with its total analysis and compounded rubber test results.

Properties of the product obtained in Example 6

| | |
| --- | --- |
| Amount of oil absorption (ml./g.) | 2.3 |
| specific surface area (m.²/g.) | 136 |
| Bulk density.g./ml.) | 0.22 |

Total analysis of the product (%)

| | |
|---|---|
| $SiO_2$ | 94.70 |
| $Al_2O_3$ | 1.20 |
| $Fe_2O_3$ | 0.53 |
| CaO | |
| MgO | 0.81 |
| ignition loss | 4.00 |

Compounded rubber test results

| | |
|---|---|
| 300% modulus (kg./cm.$^2$) | 37 |
| Tensile strength (kg./cm.$^2$) | 123 |
| Elongation (%) | 830 |
| Hardness (JIS) | 46 |
| Dispersibility | good |

It can be seen from the results of this example that the product obtained by the thorough acid treatment of acid clay using other material clay is also outstanding as finely divided silica for use as fillers.

EXAMPLE 7

In this example the instance of producing finely divided silica using other acid clay and material clay mineral other than acid clay will be described.

Clay minerals used as the starting materials were as follows: As material clay C the Sanko clay produced in Kitakanbaragun, Niigata Prefecture, Japan was chosen as the halloysite of the kaolin clays. As material clay D the Cheto clay produced in America, a sub-bentonite of the bentonite clays, was chosen. On the other hand as material clay E the acid clay produced in Nakajo, Niigata Prefecture, Japan was chosen.

By using sulfuric acid in amounts corresponding to 1.5 equivalents of the total basic metal constituents of the foregoing three material clays C, D and E such that the liquid weight ratios would become about 1.20–1.30, the material clays and the 1.5 equivalents of sulfuric acid were intimately mixed, following which the mixture were granulated into cylindrical form as in example 1. This was immediately followed by carrying out the reaction for 1 hour at 350° C. using the forced draft type apparatus as used in example 3 to obtain the solid granular reaction products.

The reacted soluble basic constituents contained in these reaction products were extracted and separated in example 1 followed by cleansing and water-washing. The treated products whose water-washing was completed were then wet comminuted and thereafter elutriated and dried to obtain the thoroughly acid treated finely divided silicas of the alumina-silica type clay.

The specific surface area, bulk density and amount of oil absorption of the so obtained finely divided silicas as well as the total analysis of the products along with the total analysis of the several material clays are shown in the following tables.

| | Material clay C | Material clay D | Material clay E |
|---|---|---|---|
| Total analysis of the material clays (%) | | | |
| $SiO_2$ | 52.34 | 60.37 | 64.67 |
| $Al_2O_3$ | 30.32 | 24.83 | 17.17 |
| $Fe_2O_3$ (including FeO) | 3.26 | 2.74 | 3.50 |
| CaO | 0.86 | 2.66 | 1.13 |
| MgO | 1.33 | 3.22 | 5.25 |
| Ignition loss | 12.02 | 7.14 | 7.67 |
| Free water content | 31.0 | 35.5 | 39.0 |
| Specific surface area (m.$^2$/g.) | 56.0 | 90 | 90 |
| Properties of products | | | |
| Specific surface area (m.$^2$/g.) | 140 | 168 | 135 |
| Bulk density (g./ml.) | 1.8 | 1.6 | 1.9 |
| Amount of oil absorption (ml./g.) | 0.30 | 0.32 | 0.27 |
| Total analysis of the product | | | |
| $SiO_2$ | 94.39 | 94.26 | 94.12 |
| $Al_2O_3$ | 0.66 | 0.85 | 1.83 |
| $Fe_2O_3$ (including FeO) | 0.20 | 0.23 | 0.37 |
| CaO | 0.24 | 0.40 | none |
| MgO | none | 0.1 | none |
| Ignition loss | 4.66 | 4.08 | 3.21 |

It can be seen from the foregoing results that finely divided silica which compare favorably with the commercially available products can be obtained even in those cases where halloysite, bentonite and other acid clays are used as the starting material alumina-silica type clay.

EXAMPLE 8

In this example the instance where active clay is produced using as the starting material a pretreated acid clay, i.e., material clay A from which pyrite has been removed by first elutriating the acid clay, will be described.

After grinding material clay A, it is elutriated and then its water content is separated by filtration, thereby obtaining a pretreated acid clay A whose water content is 82 percent. The composition of the dried product was $SiO_2$ 70.92%, $Al_2O_3$ 14.47% $Fe_2O_3$ 3.03% CaO 0.88%, MgO 5.54% and ignition loss 5.50 percent. This pretreated acid clay A whose water content was 82 percent was flowed thinly into a vat and heated air was passed thereover to dry it to a water content of 65 percent, after which 1.0 equivalent of 98 percent sulfuric acid, based on the total basic metal constituents of the clay (dry basis), was added. The liquid weight ratio in this instance was about 2.5. When this mixture was intimately blended, a stable creamy state results. When this creamy mixture was reacted for 2 hours at 150° C. as in example 2, a flaky plastic reaction product was obtained. This plastic reaction product was subjected to an extraction operation as in example 2 to extract and separate the reacted soluble basic constituents followed by cleansing and water-washing. The treated product whose water-washing was completed was dried at 110° C. and thereafter dry comminuted for 30 minutes to obtain the acid-treated product.

When the properties of this product was measured in accordance to the method for testing active clay for low temperature use, it was 38.2 percent. This is a performance which is superior to that of the standard active clay for low temperature use. It is thus seen that elutriated clay can be utilized for active clay by treating it with a liquid weight ratio of 2.5.

EXAMPLE 9

In this example the instance where the liquid weight ratio is varied will be illustrated.

Material clay A was chosen as the starting material. While this material clay A has a natural water content of 42 percent, this was heated at 110° C. to remove the water until a water content of 1.5 percent was reached. The so dried material clay and the natural water-containing clay were used. Sulfuric acid was chosen as the acid to be used, and the amounts of acid added were respectively 0.2, 0.5, 1 and 1.5 equivalents of the total basic constituents contained in the material clay A, using 98 percent sulfuric acid and the solutions thereof in various concentrations.

Mixtures of varying liquid weight ratios were obtained by suitably blending the foregoing material clays and acids.

The liquid weight ratios resulting from such combinations and the states of mixtures are shown in the following table.

| Materials mixed | Amount of acid used (equivalent) | | | |
|---|---|---|---|---|
| | 0.2 | 0.5 | 1 | 1.5 |
| Dried acid clay (containing 1.5% water), $H_2SO_4$ (98% water) | ------- | *(1) | (2) | (3) |
| | | $^1$ 0.348 | $^1$ 0.660 | $^1$ 0.982 |
| Dried acid clay (containing 1.5% water), $H_2SO_4$ (98% water) | (4) | (5) | (6) | (7) |
| | $^2$ 1.10 | $^2$ 1.15 | $^2$ 1.20 | $^2$ 1.20 |
| | (8) | (9) | (10) | (11) |
| | $^3$ 1.30 | $^3$ 1.35 | $^3$ 1.40 | $^3$ 1.45 |

|  | (12) | (13) | (14) | (15) |
|---|---|---|---|---|
| Material clay A (containing 42% water), dried acid clay (containing 1.5% water), H₂SO₄ (98%) | ² 0.830 | ² 1.14 | ² 1.26 | ² 1.42 |

|  | (16) | (17) |
|---|---|---|
| Semidried clay (containing 19.4% (water), H₂SO₄ | ² 0.867 | ⁴ 1.18 |

¹ Friable.  ² Granulatable.  ³ Creamy.  ⁴ Slightly creamy.
NOTE.—* (1), (2) ... indicate the experiment.

It can be appreciated from the foregoing table that the limits defining whether the mixture is granulatable or, being creamy, is not granulatable cannot be indicated by just the liquid weight ratio value alone, there being a great difference in the state of the mixture depending upon whether the clay used as the starting material is a natural water-containing product or is a dried product. In addition, there is a difference in the state of the mixture depending upon the amount of sulfuric acid used.

The foregoing mixtures were reacted for 2 hours at 200° C. as in example 2, after which the reaction soluble basic constituents contained in the resulting reaction products were extracted and separated as in example 2 followed by cleansing and water-washing of the reaction product to obtain the acid-treated products which were produced by using various liquid weight ratios.

The products were analyzed for their residual alumina portion (Al₂O₃), which is shown below along with the amount of free sulfuric acid and the liquid weight ratio immediately after completion of the reaction.

| Experiment No. | Residual Al₂O₃ (percent) (in 100 g. of product) | Amount¹ of free sulfuric acid immediately after reaction² | Liquid weight ratio after reaction |
|---|---|---|---|
| (1) | 9.26 |  |  |
| (2) | 1.39 | 3.25 | 0.0336 |
| (3) | 0.93 | 3.50 | 0.0363 |
| (4) | 13.12 |  |  |
| (5) | 8.96 |  |  |
| (6) | 1.17 | 2.25 | 0.0231 |
| (7) | 0.80 | 3.20 | 0.0331 |
| (8) | 12.88 |  |  |
| (9) | 8.91 |  |  |
| (10) | 0.95 | 2.20 | 0.0225 |
| (11) | 0.77 | 3.20 | 0.0331 |
| (12) | 13.25 |  |  |
| (13) | 9.05 |  |  |
| (14) | 1.15 | 2.80 | 0.0286 |
| (15) | 0.82 | 3.10 | 0.0320 |
| (16) | 1.08 | 2.95 | 0.0304 |
| (17) | 0.75 | 3.56 | 0.0370 |

¹ In the case of those experiments in which the amount used of the sulfuric acid was 0.2 and 0.5 equivalents, the measurement could not be made in most cases. The measurement was made on that extracted with a prescribed amount of water.
² G./100 g. of reaction product.

It can be seen from the foregoing results that the acid clay is acid treated at the various liquid weight ratios with a small amount of acid and short period of time, and with ease of management.

EXAMPLE 10

In this example the instance where the reaction is carried out in a state in which the water content is maintained, as compared with the instance where the water content is evaporated, will be described.

Material clay A was used, and 98 percent sulfuric acid, the acid used, was added in amounts corresponding respectively to 1.0 and 1.5 equivalents of the total basic metal constituents contained in the material clay A. Adding water, as required, the clay and acid were thoroughly mixed with liquid weight ratios such as shown in the following table. The mixtures were each placed in two 300 ml. beakers of which one was left open while the other was sealed by covering with a vinyl sheet. The reaction was then carried out for 18 hours in a 60° C. constant temperature tank.

The mixing conditions, the state of the mixture and the liquid weight ratio after completion of the reaction in this case; the state of the reaction product in this case; and the residual alumina portion of the product after it had been cleansed and water-washed after extraction and separation of the reacted soluble basic metal constituents are shown in the following table.

| Amount of acid used | Water content maintained or evaporated | I |  | II |  |
|---|---|---|---|---|---|
|  |  | At time of mixing | After completion of reaction | At time of reaction | After completion of reaction |
| 1.0 equivalent. | Evaporated. | Material clay A, 326 g.; sulfuric acid, 68 g.; water 111 g.; liquid weight ratio 1.82; mayonnaise-like. | Liquid weight ratio 0.63; creamy; residual alumina portion ¹ 1.28. | Material clay A, 326 g.; sulfuric acid, 68 g.; water 80 g.; liquid weight ratio 1.66; mayonnaise-like. | Liquid weight ratio 0.38; buttery; residual alumina portion 1.25. |
|  | Maintained. |  | Liquid weight ratio 0.87; buttery; residual alumina portion 1.39. |  | Liquid weight ratio 0.54; buttery; residual alumina portion 1.37. |
| 1.5 equivalent. | Evaporated. | Material clay A, 326 g.; sulfuric acid, 102 g.; water, 66g.; liquid weight ratio 1.92; slurry-like. | Liquid weight ratio 0.45; hardjelly-like; residual alumina portion 0.91. | Material clay A, 326 g.; sulfuric acid, 102 g.; water, 26 g.; liquid weight ratio 1.70; slurry-like. | Liquid weight ratio 0.36; hardjelly-like; residual alumina portion 0.87. |
|  | Maintained. |  | Liquid weight ratio 0.47; buttery; residual alumina portion 1.17. |  | Liquid weight ratio 0.62; lumpy; residual alumina portion 1.02. |

¹ The residual alumina portion was expressed or the number of grams in 100 grams of the dried product.

It can be seen from the foregoing results that in the case of a mixture in which the material clay and the sulfuric acid have at the time of mixing been mixed with a liquid weight ratio (parts by weight ratio) of at least 1.5 the acid clay is acid treat without trouble in either the state in which the water content of the mixture has been maintained or evaporated regardless of whether the reaction has been carried out at such a low temperature as 60° C.

EXAMPLE 11

In this example the instance where the acid concentration of mixture has been varied at the time of mixing will be described.

As the material clay, material clay A was used whereas, as the amount of sulfuric acid used, the amount of acid which is favorable for the production of the so-called active clay for low temperature use, i.e., 0.66 equivalent of the total basic metal constituent, and the amount of acid favorable for the production of the active clay for high temperature use, i.e., 0.38 equivalent of the total basic metal constituents were chosen. On the other hand, the adjustment of the acid concentration was accomplished by using the dried product of material clay A to which water was added in advance such that the respective water contents would become 4, 30, 35, 40, 45 and 50(%). The reaction was carried out as in example 2, but for 14 hours at 60°C.

First, the reaction product was measured for the amount of the residual free sulfuric acid present at the time, following which the reacted soluble basic constituents were extracted and separated and thereafter the product was cleansed, water-washed, dried and comminuted. The properties of the so obtained products were investigated by conducting the decolorizability test for low and high temperature use.

The liquid weight ratio at the time of mixture, the amount of free sulfuric acid immediately after the reaction and the decolorizability of the products are shown below.

| | Treatment for low temperature use | | | Treatment for high temperature use | | |
|---|---|---|---|---|---|---|
| Water content (percent) | Liquid weight ratio at time of mixing | Amount of free sulfuric acid immediately after reaction (g./100 g.) | Decolorizability | Liquid weight ratio at time of mixing | Amount of residual free sulfuric acid immediately after reaction (g./100 g.) | Decolorizability |
| 4 | 0.45 | 22.6 | 74.3 | | | |
| 30 | 0.84 | 4.2 | 85.6 | 0.67 | 1.9 | 61.6 |
| 35 | 0.95 | 5.5 | 87.0 | 0.78 | 2.7 | 63.6 |
| 40 | 1.08 | 6.1 | 88.4 | 0.81 | 2.7 | 62.8 |
| 45 | 1.23 | 2.3 | 87.3 | 1.06 | 4.3 | 65.6 |
| 50 | 1.41 | 5.1 | 86.3 | 1.24 | 2.1 | 64.8 |
| Standard clay | | | 85.5 | | | 62.5 |

It is thus seen from the foregoing results that it is possible to produce active clay whose properties are comparable, if not superior, to those of the standard product without demonstrating practically any difference in decolorizability, if the acid treatment is carried out while maintaining the amount of acid used constant, though the acid concentration is varied at the time the material clay particles and the acid are intimately mixed, i.e., that the concentration of the acid at the time of mixing has a negligible influence if the amount of acid used relative of the material clay is set.

EXAMPLE 12

In this example the instance where the amount of acid used (in the case where the amount of acid corresponding chemically equivalently to the total basic metal constituents contained in the material clay is designated as 1 the amount of acid used in terms of this 1) during mixing is varied will be described.

As the material clay, material clay A (water content 42 percent) was used, and choosing as the acid amounts used 0.36, 0.38, 0.5, 0.66, 0.92 and 1.47 equivalents, these amounts were mixed respectively with the material clay A, using 98 percent sulfuric acid. In the case of 1.47 equivalents, the liquid weight ratio was adjusted by adding to 8 parts of material clay A 2 parts of dried clay of the material clay A.

The several mixtures were reacted for 2 hours at 200° C. in accordance with the procedure described in example 2 to obtain a solid reaction product.

The amount of free sulfuric acid of this reaction product was measured and thereafter the soluble basic constituents contained in the reaction product were extracted and separated followed by cleansing and water-washed of the reaction product to obtain the acid-treated product.

The decolorizability of the several products were determined in accordance with test methods for active clay for low and high temperature uses.

The results obtained are shown in the following table.

| Amount of acid used (equivalent) | Liquid weight ratio at time of mixing | Amount of free acid in reaction product (g./100 ml.) | Decolorizability (percent) | |
|---|---|---|---|---|
| | | | High temperature use | Low temperature use |
| 0.36 | 0.83 | 2.0 | 56.2 | 85.5 |
| 0.38 | 0.91 | 2.7 | 62.8 | |
| 0.50 | 1.00 | 3.6 | 61.3 | 86.2 |
| 0.66 | 1.08 | 6.1 | | 88.4 |
| 0.92 | 1.18 | 7.3 | 60.5 | 90.2 |
| 1.47 | 1.41 | 14.5 | 48.0 | 88.7 |
| Standard clay | | | 56.0 | 85.2 |

It can be seen from the foregoing results that when the amount of acid added to the material is varied, products of different classes are produced since the extent to which the acid clay is treated varies in accordance with the amount of acid added. Namely, it can be appreciated that in preparing a certain class of product, the amount of acid used is a much more important condition than the other treatment conditions.

EXAMPLE 13

In this example the instance where the class of acid used for the treatment is varied will be described.

As the starting material clay, material clay A (water content 42 percent) was chosen. On the other hand, the mineral acids of sulfuric, hydrochloric and nitric acids, and the organic acids of oxalic and acetic acids, were chosen as the treating acids.

The amount of acid used in the case of the clay for high temperature use was 0.38 equivalent and in the case of the clay for low temperature use was 0.66 equivalent. These amounts were intimately mixed with the material clay. The amount of acid used in the case of organic acids of oxalic acid acetic acids was, however, 1.5 equivalents.

Of these mixtures, only those of sulfuric acid oxalic acids were capable of being molded, the rest, being soft, became creamy.

The reaction of these mixtures was carried out by placing the mixtures atop a dish to a thickness about 1-2 cm. and allowing to stand for 2 hours in a constant temperature tank of 200° C. to obtain the several solid reaction products.

The extraction and separation of the reacted soluble basic constituents contained in the reaction products was carried out using the extraction apparatus as used in example 1, following which the products were cleansed, water-washed, dried and comminuted to yield active clays for high and low temperature uses, which were produced by using the various mineral and organic acids as the treating acid. The properties of these products were tested by the respective decolorizability tests for active clay for high and low temperature use, with the following results.

| | Clay for high temperature use | | Clay for low temperature use | |
|---|---|---|---|---|
| Class of acid used | Free acid in reaction product (g./100 ml.) | Decolorizability of product (percent) | Free acid in reaction product (g./100 ml.) | Decolorizability (percent) |
| Sulfuric acid | 6.7 | 64.6 | 12.7 | 86.5 |
| Hydrochloric acid | 5.4 | 67.4 | 9.6 | 84.4 |
| Nitric acid | 13.3 | 60.6 | 31.4 | 83.7 |
| Oxalic acid | 7.3 | 62.9 | 8.2 | 83.8 |
| Acetic acid | 0.7 | 63.2 | 2.1 | 76.2 |
| Standard clay | | 56.0 | | 84.0 |

It can be seem from the foregoing results that active clay can be produced by the invention process even by using the organic acids such as oxalic and acetic acid, not to mention the mineral acids such as sulfuric, hydrochloric and nitric acids.

EXAMPLE 14

In this example the instance where the reaction conditions of temperature and time have been varied in treating the mixture will be described.

Using material clay A as the starting material clay, 0.7 equivalent of sulfuric acid was added to the clay and mixed therewith. After granulating the mixture into cylindrical granules about 5 mm. ×15 mm., the acid treatment was carried out employing a forced draft type reaction apparatus or used in example 3, choosing the several treatment temperatures of room temperature (20° C.), 100° C., 200° C., 350° C., 400° C. and 500° C., and for each temperature three treatment times chosen from a period ranging from 15 minutes to 1 month.

The post treatment after the acid treatment was carried out as in example 3 to obtain the several products.

The properties of the so obtained products were measured in accordance with the method of testing for the decolorizability of active clay for low temperature use.

The results obtained are shown below.

| Treatment temperature (°C.) | Treatment time | Decolorizability of product |
|---|---|---|
| room temperature | 17 hr. | 88.5 |
| | 1 week | 88.7 |
| | 1 month* | 88.9 |
| 200 | 0.5 hr. | 88.0 |
| | 1 hr. | 88.5 |
| | 2 hr. | 88.7 |
| 350 | 0.25 hr. | 87.5 |
| | 0.5 hr. | 87.7 |
| | 1 hr. | 88.0 |
| 400 | 0.5 hr. | 70.5 |
| 500 | 0.25 hr. | 61.3 |
| | 0.5 hr. | 61.5 |
| | 1 hr. | 62.0 |

*This experiment alone was carried out by standing for 1 month at room temperature in a closed state by being enclosed in a vinyl chloride bag. The rest of the experiments were all carried out in an open state.

It can be seen from the foregoing results that the acid treatment of acid clay can be carried out at treatment temperatures ranging up to 500° C., and particularly that acid treatment of the acid clay can be carried out even when left standing at room temperature for one month in a closed state.

EXAMPLE 15

In this example the instance of using an extraction medium containing inorganic salts for the extraction to remove the basic metal constituents from the reaction product which had been subjected to the dry acid treatment will be described.

The material clay A used in example 1 was used as the starting clay in this example. In the same manner as in example 1 sulfuric acid was added in an amount corresponding to 0.66 equivalent to the material clay A to form a mixture thereof. After granulation, said mixture was left to stand at a temperature of 150° C. for 2 hours to react it under the dry conditions. As a result, there was obtained a solid, granular reaction product.

In order to extract the so obtained reaction product, the following three extraction mediums were selected:

1. an extraction medium consisting of the extraction liquid recovered in example 1 containing the basic metal constituents in high concentration and a sulfuric acid solution of B. 60 by which the pH of this extraction medium was adjusted to be 0.5, 2. an extraction medium consisting of a picking waste sulfuric acid in the steel industry (the composition of said waste sulfuric acid: free $H_2SO_4$=9.9 g./100 ml., $Fe_2O_3$=11.7 g./100 ml. and bonded $SO_3$=17.0 g./100 ml.), and 3. an extraction medium prepared by diluting a waste sulfuric acid from the rutile titanium dioxide industry (having a specific graving of 1,360 and a composition of free $H_2SO_4$= 35.6 g./100 ml., bonded $SO_3$=14.2 g./100 ml., Fe=4.28 g./100 ml., $Al_2O_3$=0.79 g./100 ml., $TiO_2$=0.85 g./100 ml. and MgO=0.91 g./100 ml.) with water so that this extraction medium might contain free $H_2SO_4$ in an amount of about 10.0 g./100 ml.

The extraction was carried out by using the same extraction apparatus under the same conditions as in example 1 except using the aforementioned three extraction mediums respectively.

Next, the reaction products, each of which was so treated with one of said extraction medium, were washed with water and dried at 110° C. for 2 hours, following which they were granulated to obtain active clays to be used at low temperatures.

The extent of disintegration of the granular product in each of said extraction medium is indicated as degree of disintegration, and the table below shows the results of disintegration tests of each of said extraction mediums. The degree of disintegration herein referred to was decided in the following procedures:

The granular reaction product (having a diameter of about 5 mm.) was packed in a wire gauze having 2 mm. mesh and immersed into each of said extraction mediums. After the prescribed period for extraction, the amount of the remaining product in the wire gauze of 2 mm. mesh was measured. Then, the degree of disintegration was calculated by dividing the numerical difference of the remaining amount from the original amount by the original amount.

The activity of each acid clay prepared in this example was calculated, according to example 1, from decolorizability to oil. The results are shown in the table below.

| Extraction medium | Extraction liquid recovered in Example 1 | Pickling waste sulfuric acid | Waste sulfuric acid from titanium dioxide industry |
|---|---|---|---|
| Decolorizability (%) | 88.2 | 87.9 | 87.8 |
| Degree of disintegration (%) | 0 | 0 | 0 |

It can be understood from the results given in the above that a product of good quality is obtainable by using even an aqueous medium containing various in organic salts in the extraction operation without disintegration of granules during the extraction step.

We claim:

1. In a process for producing active clay or finely divided silica and preventing essentially any breakdown of thereof by treating with an acid an alumina-silica clay containing acid-soluble basic metal constituents, the improvement which comprises intimately admixing said alumina-silica clay with 1.0 to 1.5 equivalents of an acid or aqueous solution thereof, based on the amount of the basic metal constituents to be removed from the starting clay, the mixture of acid or aqueous solution thereof with clay being in a proportion of 0.3 to 2.5 parts by weight of the former to one part by weight of the latter, based on the dried product of said clay, thereby completing the reaction between the acid and the clay and to from directly and to maintain a nonfluid solid reaction product, and thereafter extracting the extractable basic metal constituents from the nonfluid solid reaction product with an aqueous medium maintained at a temperature of 50° to 80° C. under conditions such that the pH of the medium is maintained at less than 1 during the extraction.

2. The process of claim 1 wherein the starting clay is a kaolin clay or a montmorillonite clay.

3. The process of claim 1 wherein the acid is sulfuric acid.

4. The process of claim 1 wherein the acid is nitric acid or hydrochloric acid.

5. In a process for producing active clay or finely divided silica and preventing essentially any breakdown thereof by treating with an acid an alumina-silica clay containing acid-soluble basic metal constituents, the improvement which comprises intimately admixing said alumina-silica clay with 1.0 to 1.5 equivalents of an acid or an aqueous solution thereof, based on the amount of the basic metal constituents to be removed from the starting clay, the mixture of acid or aqueous solution thereof with clay being in a proportion of 0.3 to 2.5 parts by weight of the former to one part by weight of the latter, based on the dried product of said clay, thereby to form and to maintain a nonfluid mixture, maintaining the mixture at a temperature ranging from room temperature to 600° C. for a time sufficient to substantially complete the reaction between the acid and the basic metal constituents, and thereafter extracting the extractable basic metal constituents from the nonfluid solid reaction product with an aqueous solution of a mineral acid having a concentration of 2 to 7 percent maintained at a temperature of 50° to 80° C. under conditions such that the pH of the medium is maintained at less than 1 during the extraction.

6. In a process for producing active clay or finely divided silica and preventing essentially any breakdown thereof by treating with an acid an alumina-silica clay containing acid-soluble basic metal constituents, the improvement which comprises intimately admixing said alumina-silica clay 1.0 to 1.5 equivalents of an acid or aqueous solution thereof, based on the amount of the basic metal constituents to be removed from the starting clay, the mixture of acid or aqueous solution thereof with clay being in a proportion of 0.3 to 2.5 parts by weight of the former to one part by weight of the latter, based on the dried product of said clay, thereby to form and to maintain a nonfluid mixture, shaping the mixture into a granular or aggregate form, maintaining the shaped mixture at a temperature ranging from room temperature to 600° C. for a time sufficient to substantially complete the reaction between the acid and the basic metal constituents, and thereafter extracting the extractable basic metal constituents from the nonfluid solid reaction product with an aqueous solution of a mineral acid having a concentration of 2 to 7 percent maintained at a temperature of 50° to 80° C. under conditions such that the pH of the medium is maintained at less than 1 during the extraction.

7. In a process for producing active clay or finely divided silica and preventing essentially any breakdown thereof by treating with an acid an alumina-silica clay containing acid-soluble basic metal constituents, the improvement which comprises intimately admixing said alumina-silica clay with 1.0 to 1.5 equivalent of an acid or aqueous solution thereof, based on the amount of the basic metal constituents to be removed from the starting clay, the mixture of acid or aqueous solution thereof being in a proportion of 0.3 to 2.5 parts by weight of the former to one part by weight of the latter, based on the dried product of said clay, thereby to form and to maintain a nonfluid mixture, shaping the mixture into a granular or aggregate form, maintaining the shaped mixture at a temperature ranging from room temperature to 600° C. for a time sufficient to substantially complete the reaction between the acid and the basic metal constituents, and thereafter extracting the extractable basic metal constituents from the nonfluid solid reaction product with an aqueous solution of a mineral acid having a concentration of 2 to 7 percent and containing an inorganic salt soluble in an aqueous medium in amount of 2 to 15 percent by weight, at a maintained temperature of 50° to 80° C. under conditions such that the pH of the medium is maintained at less than 1 during the extraction.

8. The process of claim 7 wherein said inorganic salt is a mineral acid salt of the basic metal constituent contained in the starting clay.

9. The process of claim 7 wherein said inorganic salt is selected from the group consisting of aluminum sulfate, ferrous sulfate, ferric sulfate, calcium sulfate, magnesium sulfate, and mixtures thereof.

* * * * *